United States Patent
Cope

(10) Patent No.: US 7,224,243 B2
(45) Date of Patent: May 29, 2007

(54) POWER LINE COUPLING DEVICE AND METHOD OF USING THE SAME

(75) Inventor: Leonard David Cope, Jefferson, MD (US)

(73) Assignee: Current Technologies, LLC, Germantown, MD (US)

( * ) Notice: Subject to any disclaimer, the term of this patent is extended or adjusted under 35 U.S.C. 154(b) by 0 days.

(21) Appl. No.: 11/217,316

(22) Filed: Sep. 2, 2005

(65) Prior Publication Data

US 2006/0012449 A1    Jan. 19, 2006

Related U.S. Application Data

(63) Continuation of application No. 10/292,714, filed on Nov. 12, 2002, now Pat. No. 6,982,611.

(60) Provisional application No. 60/391,523, filed on Jun. 24, 2002.

(51) Int. Cl.
*H01P 5/12* (2006.01)

(52) U.S. Cl. .................. 333/100; 333/101; 333/131

(58) Field of Classification Search ............... 333/101, 333/131, 100; 174/110 R, 107, 112 R; 340/310.01–31, 340/310.11–310.18
See application file for complete search history.

(56) References Cited

U.S. PATENT DOCUMENTS

| | | |
|---|---|---|
| 1,547,242 A | 7/1925 | Strieby |
| 2,298,435 A | 10/1942 | Tunick |
| 2,577,731 A | 12/1951 | Berger |
| 3,369,078 A | 2/1968 | Stradley |
| 3,445,814 A | 5/1969 | Spalti |
| 3,605,009 A | 9/1971 | Enge |
| 3,641,536 A | 2/1972 | Prosprich |
| 3,656,112 A | 4/1972 | Paull |
| 3,696,383 A | 10/1972 | Oishi et al. |
| 3,701,057 A | 10/1972 | Hoer |
| 3,702,460 A | 11/1972 | Blose |
| 3,810,096 A | 5/1974 | Kabat et al. |

(Continued)

FOREIGN PATENT DOCUMENTS

DE    197 28 270 A1    1/1999

(Continued)

OTHER PUBLICATIONS

"White Paper on Medium Voltage Powerline Communication (PLC) Networks", CIGRE SC D2 WG 14, Broadband PLC, (Mar. 2005), 1-58.

(Continued)

*Primary Examiner*—Robert Pascal
*Assistant Examiner*—Kimberly E Glenn
(74) *Attorney, Agent, or Firm*—Mel Barnes; Capital Legal Group, LLC

(57) ABSTRACT

The coupler of the present invention includes a plurality of core members that are disposed between the semi-conductive ground jacket and neutral conductor of a standard URD MV cable. The core members are series wound by a transformer conductor, which forms a secondary winding that is coupled to the primary of a transformer, which provides impedance translation and/or isolation. The secondary of the transformer is coupled to a connector for communicating data signals through the coupler.

20 Claims, 6 Drawing Sheets

U.S. PATENT DOCUMENTS

| | | |
|---|---|---|
| 3,846,638 A | 11/1974 | Wetherell |
| 3,895,370 A | 7/1975 | Valentini |
| 3,900,842 A | 8/1975 | Calabro et al. |
| 3,911,415 A | 10/1975 | Whyte |
| 3,933,110 A | 1/1976 | Jamieson |
| 3,942,168 A | 3/1976 | Whyte |
| 3,942,170 A | 3/1976 | Whyte |
| 3,962,547 A | 6/1976 | Pattantyus-Abraham |
| 3,964,048 A | 6/1976 | Lusk et al. |
| 3,967,264 A | 6/1976 | Whyte et al. |
| 3,973,087 A | 8/1976 | Fong |
| 3,973,240 A | 8/1976 | Fong |
| 4,004,110 A | 1/1977 | Whyte |
| 4,004,257 A | 1/1977 | Geissler |
| 4,012,733 A | 3/1977 | Whyte |
| 4,016,429 A | 4/1977 | Vercellotti et al. |
| 4,017,845 A | 4/1977 | Killian et al. |
| 4,053,876 A | 10/1977 | Taylor |
| 4,057,793 A | 11/1977 | Johnson et al. |
| 4,060,735 A | 11/1977 | Pascucci et al. |
| 4,070,572 A | 1/1978 | Summerhayes |
| 4,119,948 A | 10/1978 | Ward et al. |
| 4,142,178 A | 2/1979 | Whyte et al. |
| 4,188,619 A | 2/1980 | Perkins |
| 4,239,940 A | 12/1980 | Dorfman |
| 4,250,489 A | 2/1981 | Dudash et al. |
| 4,254,402 A | 3/1981 | Perkins |
| 4,263,549 A | 4/1981 | Toppeto |
| 4,268,818 A | 5/1981 | Davis et al. |
| 4,323,882 A | 4/1982 | Gajjer |
| 4,357,598 A | 11/1982 | Melvin, Jr. |
| 4,359,644 A | 11/1982 | Foord |
| 4,367,522 A | 1/1983 | Forstbauer et al. |
| 4,383,243 A | 5/1983 | Krügel et al. |
| 4,386,436 A | 5/1983 | Kocher et al. |
| 4,408,186 A | 10/1983 | Howell |
| 4,409,542 A | 10/1983 | Becker et al. |
| 4,413,250 A | 11/1983 | Porter et al. |
| 4,419,621 A | 12/1983 | Becker et al. |
| 4,433,284 A | 2/1984 | Perkins |
| 4,442,492 A | 4/1984 | Karlsson et al. |
| 4,457,014 A | 6/1984 | Bloy |
| 4,468,792 A | 8/1984 | Baker et al. |
| 4,471,399 A | 9/1984 | Udren |
| 4,473,816 A | 9/1984 | Perkins |
| 4,473,817 A | 9/1984 | Perkins |
| 4,475,209 A | 10/1984 | Udren |
| 4,479,033 A | 10/1984 | Brown et al. |
| 4,481,501 A | 11/1984 | Perkins |
| 4,495,386 A | 1/1985 | Brown et al. |
| 4,504,705 A | 3/1985 | Pilloud |
| 4,517,548 A | 5/1985 | Ise et al. |
| 4,569,045 A | 2/1986 | Schieble et al. |
| 4,599,598 A | 7/1986 | Komoda et al. |
| 4,636,771 A | 1/1987 | Ochs |
| 4,642,607 A | 2/1987 | Strom et al. |
| 4,644,321 A | 2/1987 | Kennon |
| 4,652,855 A | 3/1987 | Weikel |
| 4,668,934 A | 5/1987 | Shuey |
| 4,675,648 A | 6/1987 | Roth et al. |
| 4,683,450 A | 7/1987 | Max et al. |
| 4,686,382 A | 8/1987 | Shuey |
| 4,686,641 A | 8/1987 | Evans |
| 4,697,166 A | 9/1987 | Warnagiris et al. |
| 4,701,945 A | 10/1987 | Pedigo |
| 4,724,381 A | 2/1988 | Crimmins |
| 4,745,391 A | 5/1988 | Gajjar |
| 4,746,897 A | 5/1988 | Shuey |
| 4,749,992 A | 6/1988 | Fitzemeyer et al. |
| 4,766,414 A | 8/1988 | Shuey |
| 4,772,870 A | 9/1988 | Reyes |
| 4,785,195 A | 11/1988 | Rochelle et al. |
| 4,800,363 A | 1/1989 | Braun et al. |
| 4,815,106 A | 3/1989 | Propp et al. |
| 4,835,517 A | 5/1989 | van der Gracht et al. |
| 4,890,089 A | 12/1989 | Shuey |
| 4,903,006 A | 2/1990 | Boomgaard |
| 4,904,996 A | 2/1990 | Fernandes |
| 4,912,553 A | 3/1990 | Pal et al. |
| 4,962,496 A | 10/1990 | Vercellotti et al. |
| 4,973,940 A | 11/1990 | Sakai et al. |
| 4,979,183 A | 12/1990 | Cowart |
| 5,006,846 A | 4/1991 | Granville et al. |
| 5,066,939 A | 11/1991 | Mansfield, Jr. |
| 5,068,890 A | 11/1991 | Nilssen |
| 5,132,992 A | 7/1992 | Yurt et al. |
| 5,148,144 A | 9/1992 | Sutterlin et al. |
| 5,151,838 A | 9/1992 | Dockery |
| 5,185,591 A | 2/1993 | Shuey |
| 5,191,467 A | 3/1993 | Kapany et al. |
| 5,210,519 A | 5/1993 | Moore |
| 5,257,006 A | 10/1993 | Graham et al. |
| 5,264,823 A | 11/1993 | Stevens |
| 5,301,208 A | 4/1994 | Rhodes |
| 5,319,634 A | 6/1994 | Bartholomew et al. |
| 5,341,265 A | 8/1994 | Westrom et al. |
| 5,351,272 A | 9/1994 | Abraham |
| 5,355,109 A | 10/1994 | Yamazaki |
| 5,359,625 A | 10/1994 | Vander Mey et al. |
| 5,369,356 A | 11/1994 | Kinney et al. |
| 5,375,141 A | 12/1994 | Takahashi |
| 5,406,249 A | 4/1995 | Pettus |
| 5,410,720 A | 4/1995 | Osterman |
| 5,426,360 A | 6/1995 | Maraio et al. |
| 5,432,841 A | 7/1995 | Rimer |
| 5,448,229 A | 9/1995 | Lee, Jr. |
| 5,461,629 A | 10/1995 | Sutterlin et al. |
| 5,477,091 A | 12/1995 | Fiorina et al. |
| 5,485,040 A | 1/1996 | Sutterlin |
| 5,497,142 A | 3/1996 | Chaffanjon |
| 5,498,956 A | 3/1996 | Kinney et al. |
| 5,533,054 A | 7/1996 | DeAndrea et al. |
| 5,537,087 A | 7/1996 | Naito |
| 5,559,377 A | 9/1996 | Abraham |
| 5,568,185 A | 10/1996 | Yoshikazu |
| 5,579,221 A | 11/1996 | Mun |
| 5,579,335 A | 11/1996 | Sutterlin et al. |
| 5,592,354 A | 1/1997 | Nocentino, Jr. |
| 5,592,482 A | 1/1997 | Abraham |
| 5,598,406 A | 1/1997 | Albrecht et al. |
| 5,616,969 A | 4/1997 | Morava |
| 5,625,863 A | 4/1997 | Abraham |
| 5,630,204 A | 5/1997 | Hylton et al. |
| 5,640,416 A | 6/1997 | Chalmers |
| 5,664,002 A | 9/1997 | Skinner, Sr. |
| 5,684,450 A | 11/1997 | Brown |
| 5,691,691 A | 11/1997 | Merwin et al. |
| 5,694,108 A | 12/1997 | Shuey |
| 5,705,974 A | 1/1998 | Patel et al. |
| 5,712,614 A | 1/1998 | Patel et al. |
| 5,717,685 A | 2/1998 | Abraham |
| 5,726,980 A | 3/1998 | Rickard |
| 5,748,104 A | 5/1998 | Argyroudis et al. |
| 5,748,671 A | 5/1998 | Sutterlin et al. |
| 5,751,803 A | 5/1998 | Shpater |
| 5,770,996 A | 6/1998 | Severson et al. |
| 5,774,526 A | 6/1998 | Propp et al. |
| 5,777,544 A | 7/1998 | Vander Mey et al. |
| 5,777,545 A | 7/1998 | Patel et al. |
| 5,777,769 A | 7/1998 | Coutinho |
| 5,778,116 A | 7/1998 | Tomich |
| 5,796,607 A | 8/1998 | Le Van Suu |
| 5,798,913 A | 8/1998 | Tiesinga et al. |
| 5,801,643 A | 9/1998 | Williams et al. |

| | | |
|---|---|---|
| 5,802,102 A | 9/1998 | Davidovici |
| 5,805,053 A | 9/1998 | Patel et al. |
| 5,805,458 A | 9/1998 | McNamara et al. |
| 5,818,127 A | 10/1998 | Abraham |
| 5,818,821 A | 10/1998 | Schurig |
| 5,828,293 A | 10/1998 | Rickard |
| 5,835,005 A | 11/1998 | Furukawa et al. |
| 5,847,447 A | 12/1998 | Rozin et al. |
| 5,850,114 A | 12/1998 | Froidevaux |
| 5,856,776 A | 1/1999 | Armstrong et al. |
| 5,864,284 A | 1/1999 | Sanderson |
| 5,870,016 A | 2/1999 | Shrestha |
| 5,880,677 A | 3/1999 | Lestician |
| 5,881,098 A | 3/1999 | Tzou |
| 5,892,430 A | 4/1999 | Wiesman et al. |
| 5,892,758 A | 4/1999 | Argyroudis |
| 5,929,750 A | 7/1999 | Brown |
| 5,933,071 A | 8/1999 | Brown |
| 5,933,073 A | 8/1999 | Shuey |
| 5,937,003 A | 8/1999 | Sutterlin et al. |
| 5,937,342 A | 8/1999 | Kline |
| 5,949,327 A | 9/1999 | Brown |
| 5,952,914 A | 9/1999 | Wynn |
| 5,963,585 A | 10/1999 | Omura et al. |
| 5,977,650 A | 11/1999 | Rickard et al. |
| 5,978,371 A | 11/1999 | Mason, Jr. et al. |
| 5,982,276 A | 11/1999 | Stewart |
| 5,994,998 A | 11/1999 | Fisher et al. |
| 5,994,999 A | 11/1999 | Ebersohl |
| 6,014,386 A | 1/2000 | Abraham |
| 6,023,106 A | 2/2000 | Abraham |
| 6,037,678 A | 3/2000 | Rickard |
| 6,037,857 A | 3/2000 | Behrens et al. |
| 6,040,759 A | 3/2000 | Sanderson |
| 6,091,932 A | 7/2000 | Langlais |
| 6,104,707 A | 8/2000 | Abraham |
| 6,121,765 A | 9/2000 | Carlson |
| 6,140,911 A | 10/2000 | Fisher et al. |
| 6,141,634 A | 10/2000 | Flint et al. |
| 6,144,292 A | 11/2000 | Brown |
| 6,151,330 A | 11/2000 | Liberman |
| 6,151,480 A | 11/2000 | Fischer et al. |
| 6,154,488 A | 11/2000 | Hunt |
| 6,157,292 A | 12/2000 | Piercy et al. |
| 6,172,597 B1 | 1/2001 | Brown |
| 6,177,849 B1 | 1/2001 | Barsellotti et al. |
| 6,212,658 B1 | 4/2001 | Le Van Suu |
| 6,226,166 B1 | 5/2001 | Gumley et al. |
| 6,229,434 B1 | 5/2001 | Knapp et al. |
| 6,239,722 B1 | 5/2001 | Colton et al. |
| 6,243,413 B1 | 6/2001 | Beukema |
| 6,255,805 B1 | 7/2001 | Papalia et al. |
| 6,255,935 B1 | 7/2001 | Lehmann et al. |
| 6,275,144 B1 | 8/2001 | Rumbaugh |
| 6,282,405 B1 | 8/2001 | Brown |
| 6,297,729 B1 | 10/2001 | Abali et al. |
| 6,297,730 B1 | 10/2001 | Dickinson |
| 6,300,881 B1 | 10/2001 | Yee et al. |
| 6,313,738 B1 | 11/2001 | Wynn |
| 6,317,031 B1 | 11/2001 | Rickard |
| 6,331,814 B1 | 12/2001 | Albano et al. |
| 6,335,672 B1 | 1/2002 | Tumlin et al. |
| 6,373,376 B1 | 4/2002 | Adams et al. |
| 6,384,580 B1 | 5/2002 | Ochoa et al. |
| 6,396,391 B1 | 5/2002 | Binder |
| 6,396,392 B1 | 5/2002 | Abraham |
| 6,404,773 B1 | 6/2002 | Williams et al. |
| 6,407,987 B1 | 6/2002 | Abraham |
| 6,414,578 B1 | 7/2002 | Jitaru |
| 6,417,762 B1 | 7/2002 | Comer |
| 6,425,852 B1 | 7/2002 | Epstein et al. |
| 6,441,723 B1 | 8/2002 | Mansfield, Jr. et al. |
| 6,449,318 B1 | 9/2002 | Rumbaugh |
| 6,452,482 B1 | 9/2002 | Cern |
| 6,480,510 B1 | 11/2002 | Binder |
| 6,486,747 B1 | 11/2002 | DeCramer et al. |
| 6,492,897 B1 | 12/2002 | Mowery, Jr. |
| 6,496,104 B2 | 12/2002 | Kline |
| 6,504,357 B1 | 1/2003 | Hemminger et al. |
| 6,507,573 B1 | 1/2003 | Brandt et al. |
| 6,515,485 B1 | 2/2003 | Bullock et al. |
| 6,522,626 B1 | 2/2003 | Greenwood |
| 6,522,650 B1 | 2/2003 | Yonge, III et al. |
| 6,549,120 B1 | 4/2003 | De Buda |
| 6,577,231 B2 | 6/2003 | Litwin, Jr. et al. |
| 6,590,493 B1 | 6/2003 | Rasimas et al. |
| 6,611,134 B2 | 8/2003 | Chung |
| 6,624,532 B1 | 9/2003 | Davidow et al. |
| 6,624,745 B1 | 9/2003 | Willer |
| 6,646,447 B2 | 11/2003 | Cern et al. |
| 6,650,249 B2 | 11/2003 | Meyer et al. |
| 6,667,685 B2 | 12/2003 | Wasaki et al. |
| 6,668,058 B2 | 12/2003 | Grimes |
| 6,683,531 B2 | 1/2004 | Diamanti et al. |
| 6,686,832 B2 | 2/2004 | Abraham |
| 6,696,925 B1 | 2/2004 | Aiello, Jr. |
| 6,753,742 B2 | 6/2004 | Kim |
| 6,785,532 B1 | 8/2004 | Rickard |
| 6,785,592 B1 | 8/2004 | Smith et al. |
| 6,788,745 B1 | 9/2004 | Lim et al. |
| 6,809,633 B2 | 10/2004 | Cern |
| 6,844,809 B2 | 1/2005 | Manis et al. |
| 6,844,810 B2 | 1/2005 | Cern |
| 6,922,135 B2 | 7/2005 | Abraham |
| 6,933,835 B2 | 8/2005 | Kline |
| 6,950,567 B2 | 9/2005 | Kline |
| 6,958,680 B2 | 10/2005 | Kline |
| 6,965,302 B2 | 11/2005 | Mollenkopf et al. |
| 6,965,303 B2 | 11/2005 | Mollenkopf |
| 6,975,210 B2 * | 12/2005 | Cern ................... 455/41.1 |
| 6,980,089 B1 | 12/2005 | Kline |
| 6,980,090 B2 | 12/2005 | Mollenkopf |
| 6,982,611 B2 | 1/2006 | Cope |
| 6,998,962 B2 | 2/2006 | Cope et al. |
| 7,042,351 B2 | 5/2006 | Kline |
| 7,046,882 B2 | 5/2006 | Kline |
| 7,061,370 B2 * | 6/2006 | Cern ................... 323/222 |
| 7,102,478 B2 | 9/2006 | Pridmore et al. |
| 2001/0038329 A1 | 11/2001 | Diamanti et al. |
| 2001/0052843 A1 | 12/2001 | Wiesman et al. |
| 2001/0054953 A1 | 12/2001 | Kline |
| 2002/0002040 A1 | 1/2002 | Kline et al. |
| 2002/0010870 A1 | 1/2002 | Gardner |
| 2002/0041228 A1 | 4/2002 | Zhang |
| 2002/0048368 A1 | 4/2002 | Gardner |
| 2002/0060624 A1 | 5/2002 | Zhang |
| 2002/0080010 A1 | 6/2002 | Zhang |
| 2002/0095662 A1 | 7/2002 | Ashlock et al. |
| 2002/0097953 A1 | 7/2002 | Kline |
| 2002/0098867 A1 | 7/2002 | Meiksen et al. |
| 2002/0098868 A1 | 7/2002 | Meiksen et al. |
| 2002/0105413 A1 | 8/2002 | Cern et al. |
| 2002/0109585 A1 | 8/2002 | Sanderson |
| 2002/0110310 A1 | 8/2002 | Kline |
| 2002/0110311 A1 | 8/2002 | Kline |
| 2002/0118101 A1 | 8/2002 | Kline |
| 2002/0121963 A1 | 9/2002 | Kline |
| 2002/0154000 A1 | 10/2002 | Kline |
| 2002/0171535 A1 | 11/2002 | Cern |
| 2003/0007570 A1 | 1/2003 | Kim et al. |
| 2003/0007576 A1 | 1/2003 | Alavi et al. |
| 2003/0054793 A1 | 3/2003 | Manis et al. |
| 2003/0062990 A1 | 4/2003 | Schaeffer, Jr. et al. |
| 2003/0067910 A1 | 4/2003 | Razazian et al. |
| 2003/0090368 A1 | 5/2003 | Ide |
| 2003/0103307 A1 | 6/2003 | Dostert |

| | | | | | | |
|---|---|---|---|---|---|---|
| 2003/0107477 | A1 | 6/2003 | Ide | EP | 0 933 883 A2 | 8/1999 |
| 2003/0129978 | A1 | 7/2003 | Akiyama et al. | EP | 0 933 883 A3 | 8/1999 |
| 2003/0149784 | A1 | 8/2003 | Ide | EP | 0 948 143 A2 | 10/1999 |
| 2003/0160684 | A1 | 8/2003 | Cern | EP | 0 959 569 A1 | 11/1999 |
| 2003/0169155 | A1 | 9/2003 | Mollenkopf et al. | EP | 1 011 235 A2 | 6/2000 |
| 2003/0179080 | A1 | 9/2003 | Mollenkopf et al. | EP | 1 014 640 A2 | 6/2000 |
| 2003/0184433 | A1 | 10/2003 | Zalitsky et al. | EP | 1 043 866 A2 | 10/2000 |
| 2003/0201759 | A1 | 10/2003 | Cern | EP | 1 043 866 A3 | 10/2000 |
| 2003/0201873 | A1 | 10/2003 | Cern | EP | 1 075 091 A1 | 2/2001 |
| 2003/0210135 | A1 | 11/2003 | Cern | EP | 0 916 194 B1 | 9/2001 |
| 2003/0210734 | A1 | 11/2003 | Kaku | EP | 1 011 235 A3 | 5/2002 |
| 2003/0222747 | A1 | 12/2003 | Perkinson et al. | EP | 1 213 849 A1 | 6/2002 |
| 2003/0222748 | A1 | 12/2003 | Cern et al. | EP | 1 217 760 A1 | 6/2002 |
| 2003/0224784 | A1 | 12/2003 | Hunt et al. | EP | 1 014 640 A3 | 7/2002 |
| 2003/0227373 | A1 | 12/2003 | Lou et al. | EP | 1 021 866 B1 | 10/2002 |
| 2003/0232599 | A1 | 12/2003 | Dostert | EP | 1 251 646 A2 | 10/2002 |
| 2003/0234713 | A1 | 12/2003 | Pridmore, Jr. et al. | EP | 1 253 699 A2 | 10/2002 |
| 2004/0001438 | A1 | 1/2004 | Aretz | ES | 2 122 920 A1 | 12/1998 |
| 2004/0003934 | A1 | 1/2004 | Cope | FR | 2 326 087 | 7/1976 |
| 2004/0032320 | A1 | 2/2004 | Zalitzky et al. | GB | 1 548 652 | 7/1979 |
| 2004/0037317 | A1 | 2/2004 | Zalitzky et al. | GB | 2 101 857 A | 1/1983 |
| 2004/0054425 | A1 | 3/2004 | Elmore | GB | 2 293 950 A | 4/1996 |
| 2004/0056734 | A1 | 3/2004 | Davidow | GB | 2 315 937 A | 2/1998 |
| 2004/0064782 | A1 | 4/2004 | Lerner et al. | GB | 2 331 683 A | 5/1999 |
| 2004/0090284 | A1 | 5/2004 | Cern | GB | 2 335 335 A | 9/1999 |
| 2004/0104798 | A1 | 6/2004 | Cern | GB | 2 341 776 A | 3/2000 |
| 2004/0110483 | A1 | 6/2004 | Mollenkopf | GB | 2 342 264 A | 4/2000 |
| 2004/0113756 | A1 | 6/2004 | Mollenkopf | GB | 2 347 601 A | 9/2000 |
| 2004/0113757 | A1 | 6/2004 | White, II et al. | JP | 1276933 | 11/1989 |
| 2004/0135676 | A1 | 7/2004 | Berkman et al. | NZ | 276741 | 7/1998 |
| 2004/0142599 | A1 | 7/2004 | Cope et al. | WO | 84/01481 A1 | 4/1984 |
| 2004/0174851 | A1 | 9/2004 | Zalitzky et al. | WO | 90/13950 A2 | 11/1990 |
| 2004/0183619 | A1 | 9/2004 | Sugg | WO | 92/16920 A1 | 10/1992 |
| 2004/0196144 | A1 | 10/2004 | Crenshaw et al. | WO | 93/07693 A1 | 4/1993 |
| 2004/0223617 | A1 | 11/2004 | Corcoran et al. | WO | 95/29536 A1 | 11/1995 |
| 2004/0227621 | A1 | 11/2004 | Cope et al. | WO | 98/01905 A1 | 1/1998 |
| 2004/0227622 | A1 | 11/2004 | Giannini et al. | WO | 98/33258 A2 | 7/1998 |
| 2005/0046550 | A1 | 3/2005 | Crenshaw et al. | WO | 98/33258 A3 | 7/1998 |
| 2005/0077868 | A1 | 4/2005 | Cern | WO | 98/40980 A1 | 9/1998 |
| 2005/0164666 | A1 | 7/2005 | Lang et al. | WO | 99/59261 A1 | 11/1999 |
| 2005/0168326 | A1 | 8/2005 | White et al. | WO | 00/16496 A2 | 3/2000 |
| 2006/0036388 | A1 | 2/2006 | Swarztrauber | WO | 00/59076 A1 | 10/2000 |
| 2006/0044076 | A1 | 3/2006 | Law | WO | 00/60701 A1 | 10/2000 |
| 2006/0244571 | A1 | 11/2006 | Yaney et al. | WO | 00/60822 A1 | 10/2000 |
| | | | | WO | 01/08321 A1 | 2/2001 |

FOREIGN PATENT DOCUMENTS

| | | |
|---|---|---|
| DE | 100 08 602 A1 | 6/2001 |
| DE | 100 12 235 C2 | 12/2001 |
| DE | 100 47 648 A1 | 4/2002 |
| DE | 100 61 584 A1 | 6/2002 |
| DE | 100 61 586 A1 | 6/2002 |
| DE | 101 00 181 A1 | 7/2002 |
| DE | 101 03 530 A1 | 8/2002 |
| DE | 100 59 564 A1 | 9/2002 |
| DE | 100 48 348 C2 | 11/2002 |
| DE | 101 190 039 A1 | 12/2002 |
| DE | 101 190 040 A1 | 12/2002 |
| DE | 100 26 930 C2 | 1/2003 |
| DE | 100 26 931 C2 | 1/2003 |
| DE | 100 42 958 C2 | 1/2003 |
| DE | 101 47 918 A1 | 4/2003 |
| DE | 101 47 916 C1 | 5/2003 |
| DE | 101 46 982 C1 | 6/2003 |
| DE | 101 47 915 C1 | 6/2003 |
| DE | 101 47 913 C1 | 7/2003 |
| EP | 0 141 673 A2 | 5/1985 |
| EP | 0 581 351 A1 | 2/1994 |
| EP | 0 632 602 A2 | 1/1995 |
| EP | 0 470 185 B1 | 11/1995 |
| EP | 0 822 721 A2 | 2/1998 |
| EP | 0 822 721 A3 | 2/1998 |
| EP | 0 913 955 A2 | 5/1999 |
| WO | 01/43305 A1 | 6/2001 |
| WO | 01/50625 A2 | 7/2001 |
| WO | 01/50625 A3 | 7/2001 |
| WO | 01/50628 A1 | 7/2001 |
| WO | 01/50629 A1 | 7/2001 |
| WO | 01/63787 A1 | 8/2001 |
| WO | 01/82497 A1 | 11/2001 |
| WO | 02/17509 A1 | 2/2002 |
| WO | 02/37712 A1 | 5/2002 |
| WO | 02/054605 A1 | 7/2002 |
| WO | 02/065684 A2 | 8/2002 |
| WO | 02/089352 A1 | 11/2002 |
| WO | 02/089353 A1 | 11/2002 |
| WO | 03/009083 A2 | 1/2003 |
| WO | 03/009083 A3 | 1/2003 |
| WO | 03/010896 A1 | 2/2003 |
| WO | 03/30396 A2 | 4/2003 |
| WO | 03/034608 A2 | 4/2003 |
| WO | 03/039022 A1 | 5/2003 |
| WO | 03/040732 A2 | 5/2003 |
| WO | 03/056715 A1 | 7/2003 |
| WO | WO-2004/021600 A1 | 3/2004 |

OTHER PUBLICATIONS

"White Paper on Medium Voltage Powerline Communication (PLC) Networks Annexes", CIGRE SC D2 WG 14, Broadband PLC, (Apr. 2005), 1-15.

U.S. Appl. No. 09/765,910, filed Jan. 19, 2001, Kline.
U.S. Appl. No. 09/805,638, filed Mar. 14, 2001, Kline.
U.S. Appl. No. 09/835,532, filed Apr. 16, 2001, Kline.
U.S. Appl. No. 09/837,972, filed Apr. 19, 2001, Kline et al.
U.S. Appl. No. 09/912,633, filed Jul. 25, 2001, Kline.
U.S. Appl. No. 09/915,459, filed Jul. 26, 2001, Kline.
U.S. Appl. No. 09/924,730, filed Aug. 8, 2001, Kline.
U.S. Appl. No. 10/016,998, filed Dec. 14, 2001, Kline.
U.S. Appl. No. 10/036,914, filed Dec. 21, 2001, Mollenkopf et al.
U.S. Appl. No. 10/075,708, filed Feb. 14, 2002, Kline.
U.S. Appl. No. 10/075,332, filed Feb. 14, 2002, Kline.
U.S. Appl. No. 10/150,694, filed May 16, 2002, Gidge.
U.S. Appl. No. 10/165,992, filed Jun. 10, 2002, Kline.
U.S. Appl. No. 10/293,799, filed Nov. 13, 2002, Huebner.
U.S. Appl. No. 10/292,745, filed Nov. 12, 2002, Cope et al.
U.S. Appl. No. 10/292,714, filed Nov. 12, 2002, Cope.
U.S. Appl. No. 10/315,725, filed Dec. 10, 2002, Cope et al.
U.S. Appl. No. 10/319,317, filed Dec. 13, 2002, Mollenkopf et al.
U.S. Appl. No. 10/348,164, filed Jan. 21, 2003, Cope et al.
U.S. Appl. No. 10/385,899, filed Mar. 10, 2003, Mollenkopf.
U.S. Appl. No. 10/436,778, filed May 13, 2003, Giannini et al.
U.S. Appl. No. 10/434,024, filed May 8, 2003, Corcoran et al.
U.S. Appl. No. 10/626,308, filed Jul. 23, 2003, Berkman et al.
U.S. Appl. No. 10/641,689, filed Aug. 14, 2003, White, II et al.
U.S. Appl. No. 10/675,409, filed Sep. 30, 2003, Mollenkopf.
Patent Abstracts of Japan, Japanese Publication No. 10200544 A2, published Jul. 31, 1998, (Matsushita Electric Works, LTD).
Tohoku Electric Power, Co., Inc., "Tohoku Electric Develops High-Speed Communications System Using Power Distribution Lines," *Tohoku Currents*, Spring 1998, 8(1), 2 pages (http://www.tohoku-epco.co.jp/profil/kurozu/c_vol8_1/art04.htm).
Power Line Communications Conference entitled, "PLC, A New Competitor in Broadband Internet Access," Dec. 11-12, 2001, Washington, D.C., 60 pages.
Rivkin, S. R., "Co-Evolution of Electric & Telecommunications Networks," *The Electricity Journal*, May 1998, 71-76.
Marketing Assessment Presentation entitled "Powerline Telecommunications," The Shpigler Group for CITI PLT, Jul. 16, 2002, 9 pages.
Campbell, C., presentation entitled "Building a Business Case for PLC: Lessons Learned From the Communication Industry Trenches," KPMG Consulting, Jul. 16, 2002, 5 pages.
"Embedded Power Line Carrier Modem," Archnet Electronic Technology, http://www.archnetco.com/english/product/ATL90.htm, © 2001, 3 pages.
"Archnet: Automatic Meter Reading System Power Line Carrier Communication", www.archnetco.com/english/product/product_sl.htm, © 2001, 3 pages.
"Power Line Communications Solutions", www.echelon.com/products/oem/transceivers/powerline/default.htm, © 2002, 2 pages.
"Texas Instruments: System Block Diagrams; Power Line Communication (Generic)", http://focus.ti.com/docs/apps/catalog/resources/blockdiagram.jhtml?bdId=638, © 1995-2002 1 page.
Feduschak, N.A., "Waiting in the Wings: Is Powerline Technology Ready to Compete with Cable?", Mar. 2001, www.cabletoday.com/ic2/archives/0301/0301powerline.htm, 5 pages.
"Signalling on Low-Voltage Electrical Installations in the Frequency Band 3kHz to 148.5kHz-Part 4: Filters at the Interface of the Indoor and Outdoor Electricity Network", *CLC SC 105A (Secretariat)* May 1992, 62, 1-11.
"Intellon Corporation Test Summary for Transformerless Coupler Study", *Intellon No News Wires*, Dec. 24, 1998, DOT/NHTSA Order No. DTNH22-98-P-07632, pp. 1-18.
EMETCON *Automated Distribution System*, ABB Power T & D Company, Inc., Jan. 1990, Raleigh, North Carolina, No. B-919A, 14 pages.
"Dedicated Passive Backbone for Power Line Communications", *IBM Technical Disclosure Bulletin*, Jul. 1997, 40(7), 183-185.
Coaxial Feeder Cables [Engineering Notes], *PYE Telecommunications Limited Publication Ref No. TSP507/1*, Jun. 1975, Cambridge, England, 15 pages.

"Centralized Commercial Building Applications with the Lonworks ® PLT-21 Power Line Transceiver", *Lonworks Engineering Bulletin*, Echelon, Apr. 1997, pp. 1-22.
Plexeon Logistics, Inc., "Power Line Communications", www.plexeon.com/power.html, © 1998-2003, 2 pages.
"EMETCON Automated Distribution System: Communications Guide", *Westinghouse ABB Power T & D Company Technical Manual 42-6001A*, Sep. 1989, 55 pages.
Abraham, K.C. et al., "A Novel High-Speed PLC Communication Modem", *IEEE Transactions on Power Delivery*, 1992, 7(4), 1760-1768.
J.M. Barstow., "A Carrier Telephone System for Rural Service", *AIEE Transactions*, 1947, 66, 301-307.
Chang, S.S.L., "Power-Line Carrier", *Fundamentals Handbook of Electrical and Computer Engineering*, vol. II-Communication, Control, Devices and Systems, John Wiley & Sons, New York, 1983, 617-627.
Chen, Y-F. et al. "Baseband Transceiever Design of a 128-Kbps Power-Line Modem for Household Applications", *IEEE Transactions on Power Delivery*, 2002, 17(2), 338-344.
Coakley, N.G. et al., "Real-Time Control of a Servosystem Using the Inverter-Fed Power Lines to Communicate Sensor Feedback", *IEEE Transactions on Industrial Electronics*, 1999, 46(2), 360-369.
Esmailian, T. et al., "A Discrete Multitone Power Line Communication System", *Department of Electrical and Computer Engineering*, University of Toronto, Ontario Canada, 2000 IEEE, pp. 2953-2956.
Kawamura, A. et al., "Autonomous Decentralized Manufacturing System Using High-speed Network with Inductive Transmission of Data and Power", *IEEE*, 1996, 940-945.
Kilbourne, B. "EEI Electric Perspectives: The Final Connection", www.eei.org/ep/editorial/Jul-01/0701conenct.htm, Jul./Aug. 2001, 7 pages.
Kim, W-O., et al., "A Control Network Architecture Based on EIA-709.1 Protocol for Power Line Data Communications", *IEEE Transactions on Consumer Electronics*, 2002, 48(3), 650-655.
Lim, C.K. et al., "Development of a Test Bed for High-Speed Power Line Communications", School of Electrical and Electronic Engineering, Nanyang Technological University, Singapore, *IEEE*, 2000, 451-456.
Lokken, G. et al., "The Proposed Wisconsin electric Power Company Load Management System Using Power Line Carrier Over Distribution Lines", *1976 National Telecommunications Conference, IEEE*, 1976, 2.2-1 2.2-3.
Marthe, E. et al., "Indoor Radiated Emission Associated with Power Line Communication Systems", *Swiss Federal Institute of Technology Power Systems Laboratory IEEE*, 2001, 517-520.
Naredo, J.L. et al., "Design of Power Line Carrier Systems on Multitransposed Delta Transmission Lines", *IEEE Transactions on Power Delivery*, 1991, 6(3), 952-958.
Nichols, K., "Build a Pair of Line-Carrier Modems", *CRC Electronics-Radio Electronics*, 1988, 87-91.
Okazaki, H, et al., "A Transmitting, and Receiving Method for CDMA Communications Over Indoor Electrical Power Lines", *IEEE*, 1998, pp. VI-522-VI-528.
B. Don Russell, "Communication Alternatives for Distribution Metering and Load Management", *IEEE Transactions on Power Apparatus and Systems*, 1980, vol. PAS-99(4), pp. 1448-1455.
Sado, WN. et al., "Personal Communication on Residential Power Lines-Assessment of Channel Parameters", Nov. 6-10, 1995, *IEEE*, 532-537.
Lonworks Engineering Bulletin, "Demand Side Management with Lonworks® Power Line Transceivers", Dec. 1996, 36 pages.
HomePlug™Powerline Alliance, HomePlug Initial Draft Medium Interface Specification, May. 19, 2000, 109 pages.
HomePlug™Powerline Alliance, HomePlug 0.5 Draft Medium Interface Specification, Nov. 28, 2000, 133 pages.
HomePlug™Powerline Alliance, HomePlug Initial Draft Medium Interface Specification, Jul. 27, 2000, 109 pages.
HomePlug™Powerline Alliance, HomePlug 1.01 Specification, Dec. 1, 2001, 139 pages.

Summary of an IEEE Guide for Power-Line Carrier Applications, A Report by the Power System Communications Committee, *IEEE Transactions on Power Apparatus and Systems*, vol. PAS-99, No. 6, Nov./Dec. 1980, pp. 2334-2337.

Communication Link on the LV Power Supplies for Utility Services: Field Tests in Belgium, Apr. 3-5, 1990, *Sixth International Conference on*, Manchester, UK. pp. 168-172.

Tanaka, M., "Transmission Characteristics of a Power Line Used for Data Communications at High Frequencies," IEEE Transactions on Consumer Electronics, Feb. 1989, vol. 35, No. 1, pp. 37-42.

Hasler, E. F. et al., "Communication Systems Using Bundle Conductor Overhead Power Lines," IEEE Transactions on Power Apparatus and Systems, Mar./Apr. 1975, vol. PAS-94, No. 2, pp. 344-349.

IEEE Guide for Power-Line Carrier Applications, ANSI/IEEE Std 643-1980, © 1980 by The Institute of Electrical and Electronics Engineers, Inc., pp. 1-80.

Hatori, M. et al., "Home Informatization and Standardization of Home Bus," IEEE Transactions on Consumer Electronics, Aug. 1986, vol. CE-32, No. 3, pp. 542-549.

Hunt, J. M. et al., "Electrical Energy Monitoring and Control System for the Home," IEEE Transactions on Consumer Electronics, Aug. 1986, vol. CE-32, No. 3, pp. 578-583.

Gutzwiller, F. W. et al., "Homenet: A Control Network for Consumer Applications," IEEE Transactions on Consumer Electronics, Aug. 1983, vol. CE-29, No. 3, pp. 297-304.

Burrascano, P. et al., "Digital Signal Transmission on Power Line Carrier Channels: An Introduction," IEEE Transactions on Power Delivery, Jan. 1987, vol. PWRD-2, No. 1, pp. 50-56.

Burr, A. G. et al., "Effect of HF Broadcast Interference on PowerLine Telecommunications Above 1 Mhz," ©1998 IEEE, pp. 2870-2875.

Onunga, J. et al., "Distribution Line Communications Using CSMA Access Control with Priority Acknowledgements," IEEE Transactions on Power Delivery, Apr. 1989, vol. 4, No. 2, pp. 878-886.

Tanaka, M., "High Frequency Noise Power Spectrum, Impedance and Transmission Loss of Power Line in Japan on Intrabuilding Power Line Communications," *IEEE Transactions on Consumer Electronics*, May 1988, vol. 34, No. 2, pp. 321-326.

Meng, H. et al., "A Transmission Line Model for High-Frequency Power Line Communication Channel," ©2002 IEEE, pp. 1290-1295.

Burrascano, P. et al., "Performance Evaluation of Digital Signal Transmission Channels on Coronating Power Lines," ©1988 IEEE, pp. 365-368.

DiClementi, D. A. et al., "Electrical Distribution System Power Line Characterization," ©1996 IEEE, pp. 271-276.

Abraham, K. C. et al., "A Novel High-Speed PLC Communication Modem," IEEE Transactions on Power Delivery, Oct. 1992, vol. 7, No. 4, pp. 1760-1768.

Yoshitoshi, M. et al., "Proposed Interface Specifications For Home Bus," IEEE Transactions on Consumer Electronics, Aug. 1986, vol. CE-32, No. 3, pp. 550-557.

O'Neal, Jr., J. B., "The Residential Power Circuit as a Communication Medium," IEEE Transactions on Consumer Electronics, Aug. 1986, vol. CE-32, No. 3, pp. 567-577.

Dostert, K., "EMC Aspects of High Speed Powerline Communications," Proceedings of the 15$^{th}$ International Wroclaw Symposium and Exhibition on Electromagnetic Capability, Jun. 27-30, 2000; Wroclaw, Poland, pp. 98-102.

Piety, R. A., "Intrabuilding Data Transmission Using Power-Line Wiring," Hewlett-Packard Journal, May 1987, pp. 35-40.

Dostert, K., Powerline Communications, Ch. 5, pp. 286, 288-292, Prentice Hall PTR, Upper Saddle River, NJ ©2001.

Liu, E. et al., "Broadband Characterization of Indoor Powerline Channel," Communications Laboratory, Helsinki University of Technology, Finland [presented at the 2004 International Symposium on PowerLine Communications and its Applications, Zaragoza, Spain. Mar. 31-Apr. 2, 2004] 6 pages.

International Search dated Jul. 16, 2001, from PCT/US01/12699.

Written Opinion dated May 15, 2002, from PCT/US01/12699.

International Search Report dated Oct. 22, 2001, from PCT/US01/12291.

International Search Report dated Jun. 5, 2002, from PCT/US01/48064.

International Search Report dated Jun. 24, 2002, from PCT/US02/04310.

International Search Report dated Aug. 7, 2002, from PCT/US02/04300.

Written Opinion dated Mar. 21, 2003, from PCT/US02/04300.

International Search Report dated May 2, 2001, from PCT/US01/01810.

* cited by examiner

POWER LINE COUPLING DEVICE AND METHOD OF USING THE SAME

CROSS REFERENCE TO RELATED APPLICATION

This application claims priority to U.S. patent application Ser. No. 10/292,714 filed Nov. 12, 2002 now U.S. Pat. No. 6,982,611, which claims priority to U.S. Provisional Patent Application Ser. No. 60/391,523 filed Jun. 24, 2002.

FIELD OF THE INVENTION

The present invention relates, generally, to power line coupling devices and in particular, to a coupler for coupling data signals to and from power lines such as underground and overhead medium voltage cables.

BACKGROUND OF THE INVENTION

Well-established power distribution systems exist throughout most of the United States, and other countries, that provide power to customers via power lines. With some modification, the infrastructure of the existing power distribution systems can be used to provide data communication in addition to power delivery, thereby forming a power distribution communication system. In other words, existing power lines that already have been run to many homes and offices can be used to carry data signals to and from the homes and offices. These data signals are communicated on and off the power lines at various points in the power distribution communication system, such as, for example, near homes, offices, Internet service providers, and the like.

While the concept may sound simple, there are many challenges to overcome in order to use power lines for data communication. Power distribution systems include numerous sections, which transmit power at different voltages. The transition from one section to another typically is accomplished with a transformer. The sections of the power line distribution system that are connected to the customers typically are low voltage (LV) sections having a voltage between 100 volts and 240 volts, depending on the system. In the United States, the low voltage section typically is about 120 volts (120V). The sections of the power distribution system that provide the power to the low voltage sections are referred to as the medium voltage (MV) sections. The voltage of the MV section is in the range of 1,000 Volts to 100,000 volts and typically 8.66 kilo volts (kV) to neutral (15 kV between phase conductors). The transition from the MV section to the LV section of the power distribution system typically is accomplished with a distribution transformer, which converts the higher voltage of the MV section to the lower voltage of the LV section.

Power system transformers are one obstacle to using power distribution lines for data communication. Transformers act as a low-pass filter, passing the low frequency signals (e.g., the 50 or 60 Hz power signals) and impeding high frequency signals (e.g., frequencies typically used for data communication) from passing through the transformer. As such, power distribution communication systems face the challenge of passing the data signals around (or sometimes through) the distribution transformers.

To bypass the distribution transformer, the bypassing system needs a method of coupling data to and from the medium voltage power line. Similarly, coupling data signals to and from the medium voltage cable at a backhaul location (a location where data signals are coupled on and off the power distribution communications system) requires the same or similar coupling means. As discussed, medium voltage power lines can operate from about 1000 V to about 100 kV, and often carry high amperage. Consequently, coupling to a medium voltage power line gives rise to safety concerns for the user installing the coupling device.

Overhead medium voltage cables typically are an uninsulated conductor. In contrast, underground residential distribution (URD) MV cables typically include a center conductor, a semi-conductive layer, a dielectric, a neutral semi-conductive jacket, and a neutral conductor. Consequently, it would be desirable to have a coupling device that couples to different types of MV cables.

In addition, the coupling device should be designed to operate to provide safe and reliable communication of data signals with a medium voltage power line—carrying high power—in all outdoor environments such as extreme heat, cold, humidity, rain, high shock, and high vibration. Also, coupling around the transformer raises concern that dangerous MV voltage levels may be provided to the customer premises on the data line, which the coupling device should prevent. In addition, a coupling device should be designed so that is does not significantly compromise the signal-to-noise ratio or data transfer rate and facilitates bi-directional communication. In addition, the coupling device (or coupler as referred to herein) should enable the transmission and reception of broadband radio frequency (RF) signals used for data transmission in MV cables.

Many couplers that have been designed prior to this invention have relied on direct contact with the MV power line, which typically carries a phase-to-phase 15 kV, 60 Hertz power transmission. The phase-to-earth ground voltage of the 15 kV system is 8.66 kV. As a consequence, the electronics and power supplies associated with the couplers have to be built to isolate the 8.66 kV potential from earth ground. Various embodiments of the coupler of the present invention may provide many of the above features and overcome the disadvantages of the prior art.

SUMMARY OF THE INVENTION

The coupler of the present invention couples broadband RF signals to and from a MV cable. The coupler of one embodiment for use with underground power lines includes a coupling transformer that includes a plurality of core members that are disposed between the semi-conductive ground jacket and neutral conductor of a standard URD MV cable. The core members are series wound by a transformer conductor, which forms a secondary winding. Disposed on each side of the coupling transformer in this embodiment is a filter that attenuates interference that approaches the coupling transformer. In addition, a spacing mechanism disposed on each side of the coupling transformer holds the neutral conductor in spaced apart relation to the neutral semi-conductive ground jacket, which has a resistance much greater than that of the neutral conductor. When the neutral conductor is spaced apart, the greater resistance of the semi-conductive ground jacket forces the data return signal onto the neutral conductor, which increases the coupling of the data signal of the MV cable to the coupling transformer.

In another embodiment of the present invention for use in coupling data signals with an overhead power line, the coupling transformer is mounted to a length of URD MV cable, which has a hot clamp attached to each end of the center conductor. The hot clamps are connected to the overhead MV power line on opposite sides of a low pass filter. The neutral conductor of the URD MV cable is removed and the semi-conductive jacket may be coupled to ground via a low frequency conductive path.

Further features and advantages of the present invention, as well as the structure and operation of various embodiments of the present invention, are described in detail below with reference to the accompanying drawings.

BRIEF DESCRIPTION OF THE DRAWINGS

The accompanying drawings, which are incorporated herein and form part of the specification, illustrate various embodiments of the present invention and, together with the description, further serve to explain the principles of the invention and to enable a person skilled in the pertinent art to make and use the invention. In the drawings, like reference numbers indicate identical or functionally similar elements.

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

In the following description, for purposes of explanation and not limitation, specific details are set forth, such as particular networks, communication systems, computers, terminals, devices, components, techniques, data and network protocols, software products and systems, enterprise applications, operating systems, enterprise technologies, middleware, development interfaces, hardware, etc. in order to provide a thorough understanding of the present invention.

However, it will be apparent to one skilled in the art that the present invention may be practiced in other embodiments that depart from these specific details. Detailed descriptions of well-known networks, communication systems, computers, terminals, devices, components, techniques, data and network protocols, software products and systems, enterprise applications, operating systems, enterprise technologies, middleware, development interfaces, and hardware are omitted so as not to obscure the description of the present invention.

I. System Architecture and General Design Concepts

The coupler of the present invention may be used in a transformer bypass device, a backhaul point, or at any location at which it is desirable to couple data signals to and/or from a power line. The present invention may be used to communicate data signals with (i.e., couple data signals to and/or from) both underground and overhead power lines.

Figure 1:
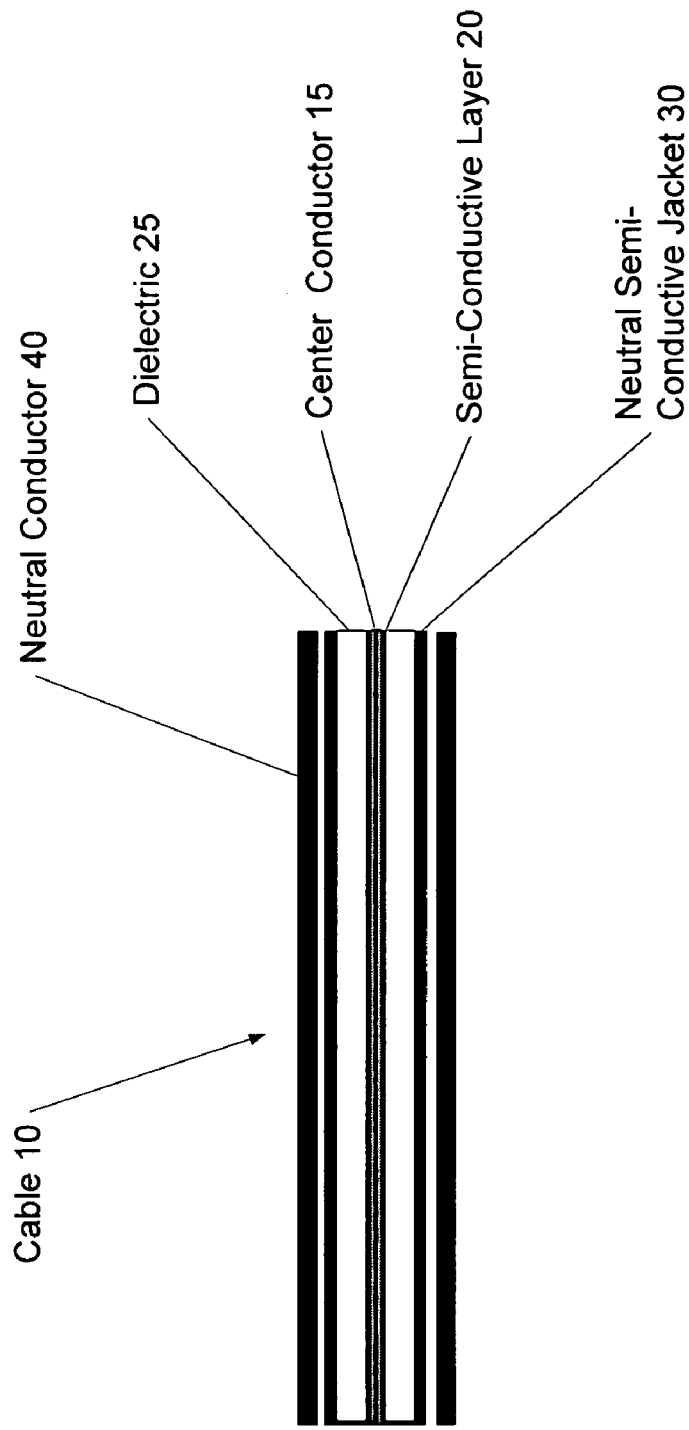
FIG. 1 is a cross sectional view of an example URD MV cable.

The present invention makes use of the architecture of existing URD MV cables. As shown in FIG. 1, the URD MV cable 10 includes a center conductor 15 that carries the power signal. Surrounding the center conductor 15 is a semi-conductive layer 20. The semi-conductive layer 20 is surrounded by a dielectric 25 (i.e., an insulator). A neutral semi-conductive jacket 30 surrounds the dielectric 25. The neutral semi-conductive jacket 30 typically ensures, among other things, that ground potential and deadfront safety (the grounding of surfaces to which a lineman may be exposed) are maintained on the surface of the cable. Finally, a neutral conductor 40 surrounds the neutral semi-conductive jacket 30. Some URD MV cables, which may be used with or form part of the present invention, may include additional or fewer components than those identified herein.

Figure 2:
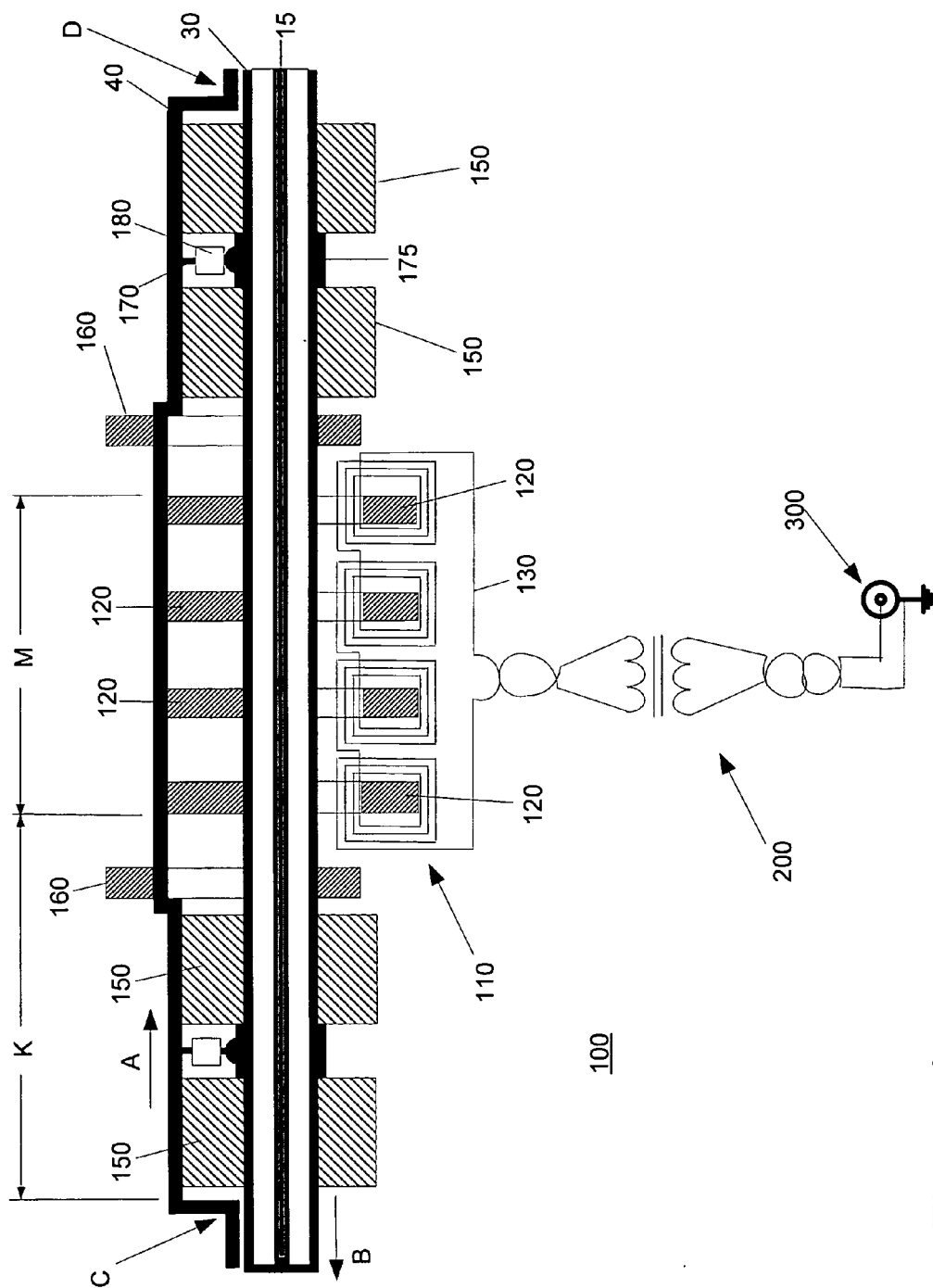
FIG. 2 is a cross sectional view of an example embodiment of a coupler according to the present invention.

FIG. 2 is a cross sectional view of an example embodiment of a coupling device 100 according to the present invention. The coupler 100 includes a coupling transformer 110. As shown in FIG. 2, in one embodiment of the present invention, the coupling transformer 110 includes a plurality of core members that are adjacent to the neutral semi-conductive jacket 30 and series-wound by the secondary winding 130. Specifically, this embodiment includes four ferrite coupling transformer toroids 120, which form the core members with each having four turns. The neutral conductor 40 is in spaced apart relation from the neutral semi-conductive jacket 30 to allow space for the coupling transformer toroids 120. The use of multiple core members improves the coupling between the primary and secondary windings, and reduces the susceptibility of the windings to RF noise pick-up.

It should be noted that FIG. 2 (and other figures herein) is not drawn to scale and is for illustrative purposes. For example, the transformer toroids 120 are preferably adjacent to each other, but shown spaced apart in FIG. 2 to illustrate the series winding.

In this embodiment, the coupling transformer 110 has a primary winding that is comprised of a single turn. The inner half-turn of the single turn formed by the inner components of the MV cable 10, including the center conductor 15, the semi-conductive layer 20, the dielectric 25, and the neutral semi-conductive jacket 30, which pass through the openings of the toroids 120. The outer half-turn is comprised of the neutral conductor 40 and the characteristic impedance between the neutral conductor 40 and inner components of the MV cable 10. From a functional perspective, the current coupled by the coupling transformer 110 is largely induced to/from the current loop composed of the center conductor 15 and the neutral conductor 40 as will be discussed in more detail below.

The coupling device 100 operates in either receive or transmit mode. First, operation of the coupling device 100 in receive mode will be discussed. Operation of the coupling device 100 in transmit mode can be evaluated in an analogous fashion. Since the system is linear, it will be evident to those skilled in the art that the models and description used in receive mode apply equally as well to the transmit mode.

This embodiment of the coupling device 100 is designed to couple RF signals transmitted on center conductor 15 with the return RF current on the neutral conductor 40. As is well-known in the art, the magnetic flux induced in a core by a current in a conductor passing on one side of a core member will add to the magnetic flux induced in the core by a current traveling in a direction opposite to the first current in a conductor on the other side of the core member.

In this embodiment, the magnetic flux induced by the RF current in a conductor passing through the transformer toroids 120 (the core members) will add to the magnetic flux induced by the return RF current on the outside of the transformer toroids 120. Referring to FIG. 2, when magnetic flux is induced by the current in conductors passing through the toroid 120 in the direction of arrow "B", additive magnetic flux will be induced by the current in the neutral conductor 40 in the direction of arrow "A."

In this embodiment, it is undesirable to allow a return RF current that would otherwise be in the neutral conductor 40 to travel through the neutral semi-conductive jacket 30 at the coupling transformer 110. Such a return current would reduce the current flowing on the outside of the toroids 120 through the neutral 40 and may induce flux that would subtract from the flux induced by currents in conductors 15 and 40. Reduced flux in the cores 120 will cause reduced currents in the windings of the current transformer 110, which result in less power delivered to connector 300 (i.e., less coupling).

Thus, depending on the configuration of the embodiment, it may be is desirable to reduce the amount of current present on the neutral semi-conductive jacket 30, which can be accomplished by insuring that the impedance between points "C" and "D" through the neutral semi-conductive jacket 30 is much greater than the impedance between those points along the neutral 40. The RF current will split inversely proportional to the impedances of these two paths. The neutral semi-conductive jacket 30 is resistive and is a high loss transmission medium. Therefore, by increasing the distance over which signals must travel until reaching the point where the neutral semi-conductive jacket 30 contacts the neutral conductor 40 (e.g., point "C"), the impedance of the neutral semi-conductive jacket signal path can be increased. Increasing the impedance of the neutral semi-conductive jacket 30 ensures that little or no current flows through the neutral semi-conductive jacket 30. As a result, most of the RF return current (and power) will travel through neutral 40 (as opposed to the neutral semi-conductive jacket 30) at the coupling transformer 110 and will induce an additive flux in the transformer core material 120.

In this embodiment, the impedance of the neutral semi-conductive jacket signal path is increased through the use of a pair of insulating spacers 150. The spacers 150 hold the neutral conductor 40 in spaced apart relation from the neutral semi-conductive jacket 30 for a distance "K" on each side of the coupling transformer 110. The desired distance "K" will be dependent, at least in part, on the intrinsic impedance of the neutral semi-conductive jacket 30, the desired amplitude of the data signals, the desired distance of transmission, and other factors. The insulating spacers 150 in this embodiment are toroids disposed between the neutral semi-conductive jacket 30 and the neutral conductor 40 on each side of the coupling transformer 110 to hold the neutral conductor 40 away from, and not in contact with, the neutral semi-conductive jacket 30 to thereby increase the resistance of the neutral semi-conductive signal path as seen from the coupling transformer 110.

The neutral conductor 40 may be held in spaced apart relation away from, and not in contact with, the neutral semi-conductive jacket 30 by any means. For example, fewer or more insulating spacers 150 may be used depending on the size of the insulating spacers 150 and the desired impedance. In addition, other components, such as a toroid used as a core forming a transformer for supplying power, may be used as an insulating spacer 150 in addition to or instead of insulating spacers 150 having no other function.

Furthermore, the insulating spacers 150 may be any desirable size or shape and, in some embodiments, may only be necessary or desirable on one side of the coupling transformer 110. In other embodiments, the insulating spacer 150 may be an insulator, but one that does not hold the neutral conductor 40 away from the neutral semi-conductive jacket 30. Such an insulator may be around the neutral semi-conductive jacket 30 and/or around neutral conductor 40 adjacent the coupling transformer 110. In addition, other embodiments of the present invention may not require a spacer because, for example, there is no need to increase the resistance of the neutral semi-conductive jacket signal path.

Because the center conductor 15 of the MV cable 10 typically is at high voltage, there will often be leakage current from the center conductor 15 to the neutral semi-conductor jacket 30. Depending on the distance that the neutral conductor 40 is held away from the neutral semi-conductor jacket 30, it may be desirable to provide a conductive path between the neutral conductor 40 and the neutral semi-conductor jacket 30 at one or more places along the length of the coupling device 100. In this embodiment, a conductive path 170 is disposed between the insulating spacers 150 on each side of the coupling transformer 110. The conductive path 170 is formed by a semi-conductive collar 175 disposed around and in contact with the neutral semi-conductive jacket 30 and which is coupled to a conductor that is coupled to the neutral 40. An RF choke 180 (e.g., low pass filter) also is disposed in the conductive path in order to prevent high frequency data signals from passing through the conductive path 170 so that the conductive path 170 is a low frequency conductive path. As is well known to those skilled in the art, the RF choke (e.g., low pass filter) 180 may be any device, circuit, or component for filtering (i.e., preventing the passage of) high frequency signals such as an inductor, which, for example, may be a ferrite toroid (or ferrite bead).

Moving the neutral conductor 40 away from the center conductor 15 increases the impedance of the MV cable 10 and increases the susceptibility of the cable to external RF interference and radiation. This susceptibility is reduced through use of a filter, which in this embodiment is formed with toroids. The toroid filters 160 are disposed around the entire MV cable 10 at each end of the coupling transformer 110. Typically, interference and radiation will be induced in both the neutral conductor 40 and center conductor 15. If the interference source is distant from the cable, the radiation will be uniform at the cable. The direction of the induced noise current will be the same in all conductors of the MV cable 10. This interference and radiation is known as "common mode noise." Toroids 160 comprise a common mode noise filter, as is well known in the art. When such interference signal, which is traveling on the neutral conductor 40 and center conductor 15, reaches the toroid filter 160, the interference signal induces a magnetic flux in the toroid filter 160.

The flux created by current on neutral conductor 40 and center conductor 15 is in the same direction and adds in the toroid filter 160. Thus, the toroid filter 160 absorbs the energy of the interference signal thereby attenuating (i.e., filtering) the interference signal so that it does not reach the coupling transformer 110.

The data signals, however, pass through the toroid filter 160 largely unimpeded. The signals carrying data in the center conductor 15 and in the neutral conductor 40 are substantially the same amplitude, but opposite in direction. Consequently, the flux of the signals cancels each other so that no flux is induced in the toroid filter 160 and the signals are substantially unattenuated.

As discussed, the coupling transformer 110 includes a plurality of series-wound transformer toroids 120 adjacent to the neutral semi-conductive jacket 30. The use of multiple core members improves the coupling between the primary and secondary windings, and reduces the susceptibility of the windings to RF noise pick-up.

The longitudinal length ("M" in FIG. 2) of the coupling transformer 110 formed by the transformer toroids 120 may be selected based on the highest frequency of transmission carrying data. If the length of the coupling transformer 110 is equal to the length of the wavelength of the highest anticipated frequency carrying the data, the aggregate flux in the coupling transformer 110 would sum to zero and no data would be coupled to or from the MV cable 10. In this example embodiment, the total length of the coupling transformer 110, which is determined by the combined length of the transformer toroids 120 (e.g., measured from one end of the coupling transformer 110 to the other end along the power line) and indicated by distance "M" in FIG. 2, is approximately fifteen degrees (or 4.166 percent) of the length of the wavelength of the highest anticipated frequency carrying the data. Other embodiments may include a coupling transformer 110 with a length (or distance "M") that is ten degrees (or 2.778 percent), five degrees (or 1.389 percent), twenty degrees (or 5.555 percent), or some other portion of the wavelength of the highest anticipated frequency carrying the data. While not present in the example embodiment, some embodiments of the present invention may include spaces (or other components) between the transformer toroids, which would also contribute to the length of the coupling transformer 110.

In practice, a transformer, such as the coupling transformer 110, will have an input impedance composed of an equivalent resistance, and an equivalent reactance. The equivalent resistance corresponds to the real power transferred. The equivalent reactance is caused by the inductance and parasitic capacitance created by the coils of the coupling transformer 110. If the input impedance is dominated by the reactance, the percentage of power of the data signal that is coupled to the primary is reduced (i.e., influences the power factor). By adding the appropriate reactance, a coupling circuit that includes the secondary winding can be created that has a resonant frequency near the center of the communication band carrying the data signals to thereby increase and/or optimize the portion of the data signal power coupled to the power line (i.e., reduce the amount of power lost in the windings themselves). The geometry, placement, size, insulation, number, and other characteristics of the secondary winding 130 of coupling transformer 110 provide a parasitic (intrinsic) capacitance, that in this example embodiment of the present invention, provides a coupling circuit having a resonant frequency substantially at the center of the band of frequencies communicating the data signals, which is in this embodiment is approximately 40 Mhz (i.e., the center between the 30 Mhz and 50 Mhz communication channel). Providing a resonant frequency at the center of the band of frequencies communicating the data signals provides a coupling circuit that is matched to, and may provide improved performance over, the communication channel. The addition of an inductor-capacitor-resonant circuit may improve the power factor of the device in some embodiments. Other embodiments (due to manufacturing) may have resonant frequencies within twenty percent, more preferably within ten percent, and still more preferably within five percent of the center of the band of frequencies communicating the data signals.

The secondary winding 130 of the coupling transformer 110 is coupled to a primary winding of an impedance matching transformer 200, which in this embodiment uses a ferrite toroid as the core. The secondary winding of the impedance matching transformer 200 is coupled to a fifty ohm BNC connector 300. The impedance matching transformer 200 steps down the impedance of the coupling transformer 110 to match the 50 Ohm impedance of the BNC connector 300. In this embodiment, the impedance matching transformer 200 has eight turns on its primary side and four turns on its secondary side.

During operation, a data signal to be transmitted is injected into the 50 Ohm BNC connector 300 and coupled through the impedance matching transformer 200 to the secondary of the coupling transformer 110. The coupling transformer 110 couples the signal onto the center conductor 15 and the neutral conductor 40. The coupling device 100 at a remote location down the MV cable 10 receives the data signal. For example, a coupling device according to the present invention may be positioned at each end of a URD cable, which may be hundreds of meters long. Data signals transmitted from the first coupling device 100 induce a magnetic flux in the coupling transformer of the second coupling device (not shown). The flux induces a current in the secondary winding 130 of the second coupling device 100, which passes through the impedance matching transformer 200 to the BNC connector 300 of the second coupling device 100.

II. Applications

As discussed, the coupling device 100 couples data signals (e.g., RF signals) to and/or from a power line, which, in the embodiment above, is a medium voltage power line. Other embodiments of the present invention may be used to couple signals to low voltage and/or high voltage power lines.

The coupling device 100 may be located at any desired location to couple data signals to and/or from a power line, including at a backhaul point or forming part of a transformer bypass device at a transformer. Such a bypass device may include one or more of a low voltage signal processing circuit (which may include a filter, amplifier, and other components) a low voltage modem, a microprocessor and associated software, a router, a medium voltage modem, and medium voltage processing circuitry. Likewise, a backhaul device may include some subset of these components and/or other components.

URD MV cables typically are hundreds of meters long and typically extend from transformer to transformer. Consequently, the coupler 100 may be integrated into the end of the URD MV cable (during manufacturing or through a postproduction process) so that the coupler 100 resides inside the transformer enclosure (e.g., a pad mounted transformer). Alternately, the coupler 100 may be formed as an adapter that has a first end with a first connector (e.g., a plug) that is configured to mate with a socket of the transformer and a second end that has a second connector (e.g., a receptacle) that is configured to mate with the end or plug of a conventional URD MV cable, which is preferably a conventional, commercially available MV cable. In addition, in any of the embodiments the entire coupler 100 may be encased in environmentally protective encasing and/or disposed in a protective housing—for example, so that only the URD MV cable and the data cable (including the connector 300) extend from the encasing or housing.

Extending from the transformer enclosure typically is a number of low voltage power lines. One use of the coupler 100 is to couple data signals to and from the URD MV cable as part of a transformer bypass device. The transformer bypass device transmits signals, which may be based on the signals received though the coupler 100, to one or more of the low voltage lines that extend to the customer premises from the transformer enclosure. Similarly, the bypass device provides signals, at least a portion of which are based on data signals received from the low voltage power lines of customer premises to the coupler 100 for transmission down the Mv URD cable.

In addition, transformer enclosures often have two URD MV cables extending therefrom. For example, one of the two cables may carry power from the power source (referred to herein as a power input cable) and the other cable may transmit power down line to further destinations (referred to herein as a power output cable). In addition to or instead of providing communications through the low voltage power lines, the coupler of the present invention may form part of a repeater device that acts as an amplifier or repeater to transmit the data signals received from a coupler coupled to a first URD MV cable (e.g., a power input cable) through a second coupler and down a second URD MV cable (e.g., a power output cable) extending from the same (or nearby) transformer enclosure. Alternately, the repeater may receive and transmit (e.g., directionally transmit to amplify or repeat the signal) through the same coupler so that only a single coupler is necessary. The repeater device may amplify and transmit all the data signals, select data signals such as those having destination addresses for which transmission down the second cable is necessary, those select data signals that it determines should be repeated (such as all data signals not transmitted to the repeater itself), those data signals that a bypass device (or other device) indicates should be repeated, some other set of data signals as may otherwise be desired, and/or some combination thereof. Thus, the bypass and repeater devices may include a router.

In one example application, a first and second coupler 100 is disposed at the end of two URD MV cables (either integrated therein or in an adapter) that extend from the same (or nearby) transformer enclosure. The transformer bypass device is communicatively coupled to both couplers 100 and to any of the low voltage cables along which data signals may need to be communicated. Thus, the bypass device may act as both a repeater and bypass device.

III. Overhead Application

In addition to URD MV cables, the coupler 100 of the present invention may be used to couple data signals to and/or from overhead MV cables. Overhead MV cables typically are comprised of a stranded conductor without insulation, and without a dielectric, or a neutral semi-conductive jacket. In essence, the overhead MV cable typically is a bare conductor. Normally, three cables run in parallel (one cable for each phase of the three phase MV power) along with a neutral conductor.

As with its use in URD MV cables, in its overhead applications the coupler 100 may form part of a transformer bypass device or backhaul point for coupling signals to and/or from the MV power line, or for coupling data signals to and/or from a power line for any other desired device or purpose.

Figure 3:
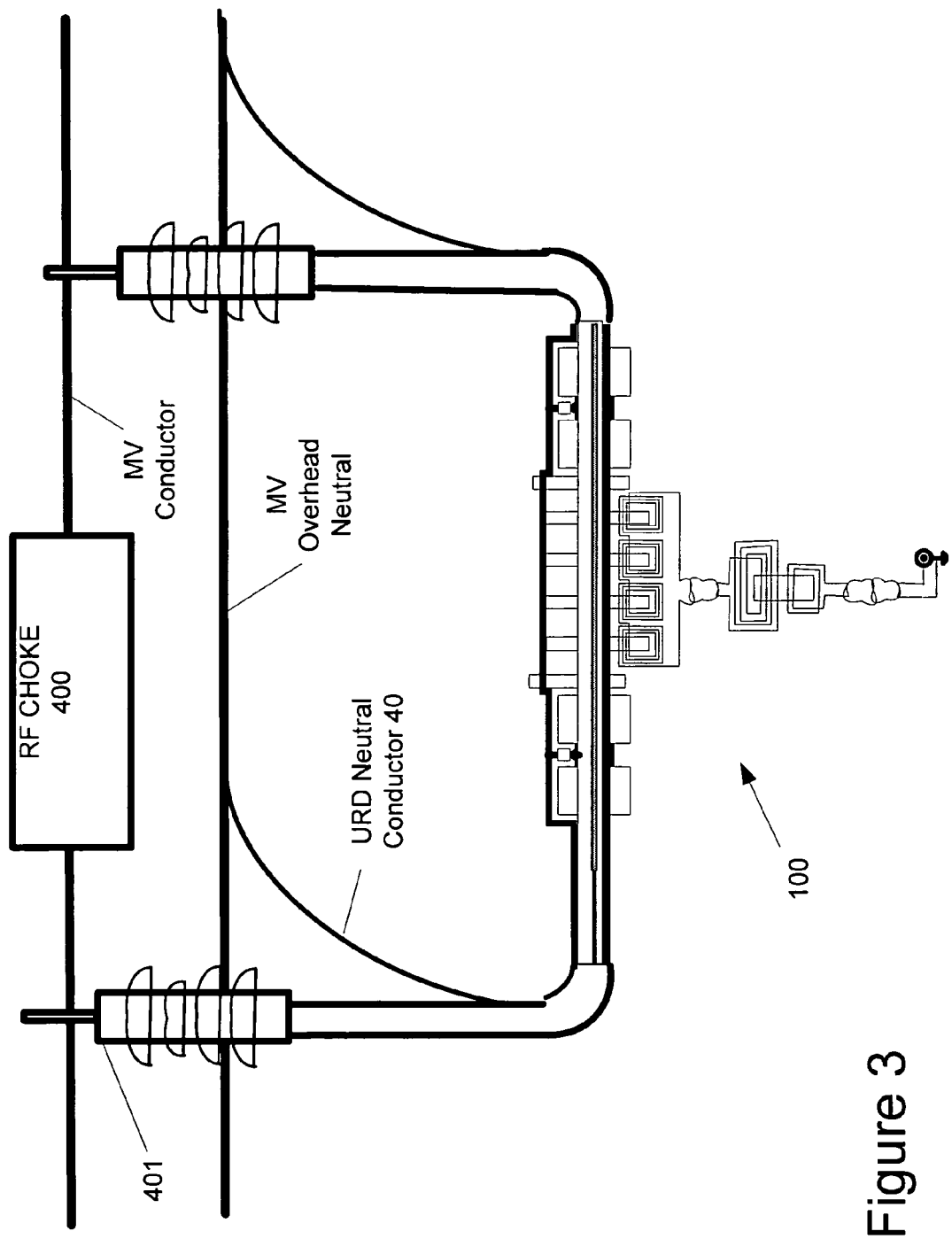
FIG. 3 is a schematic representation of another example embodiment of a coupling device according to the present invention.

To couple signals to and from the overhead MV cable, the coupling device 100 is formed with a length of URD MV cable, which as described above includes the center conductor 15, a semi-conductive layer 20, a dielectric 25 (an insulator), a neutral semi-conductive jacket 30 and the neutral conductor 40. The URD MV cable, for example, may be six gauge, eight kV cable. As shown in FIG. 3, the coupler 100 of this embodiment may include the same components as described in the previous embodiment.

Figure 4:
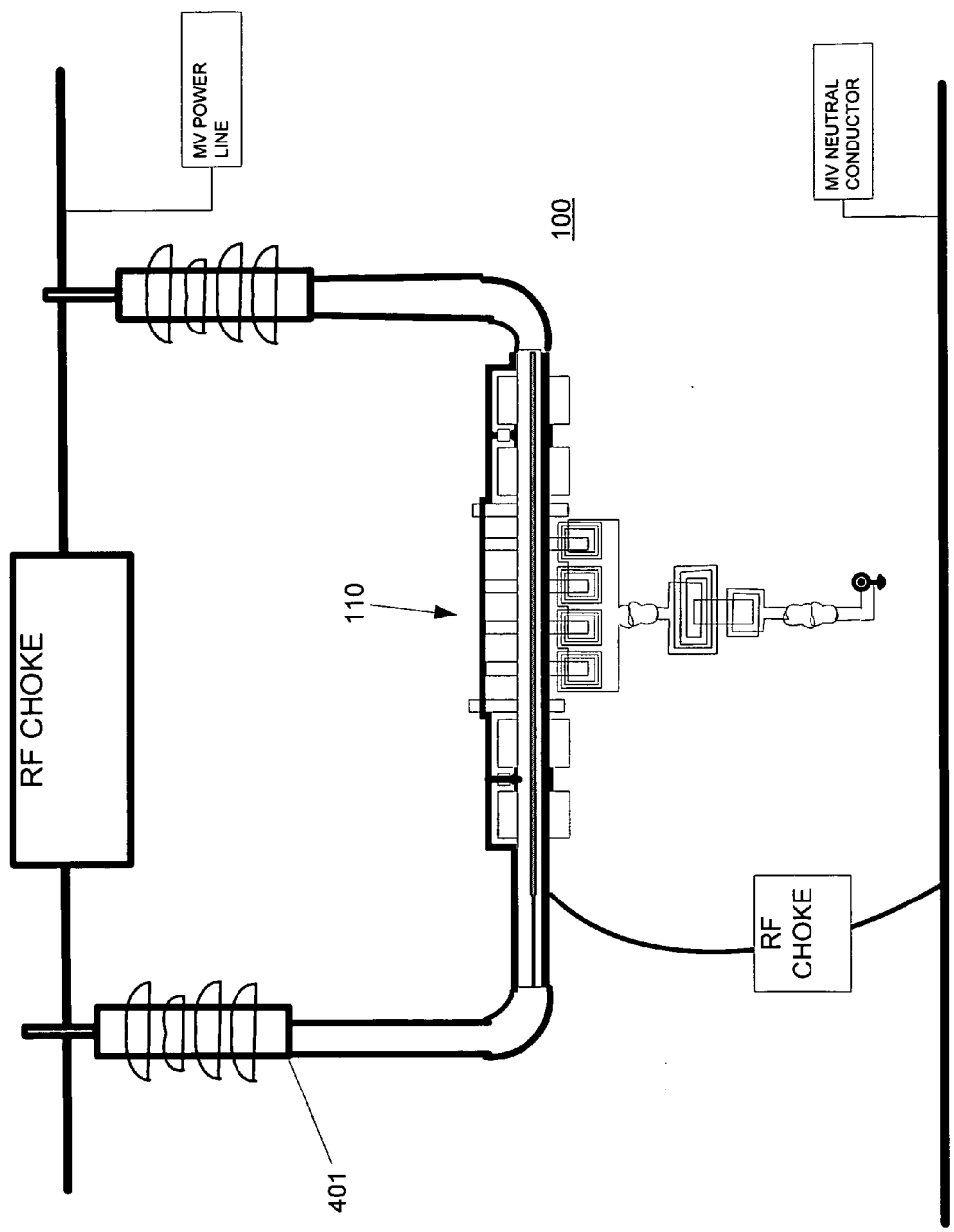
FIG. 4 is a schematic representation of another example embodiment of a coupling device according to the present invention.

In this embodiment, the center conductor 15 of each end of the URD MV cable, however, is terminated with a hot wire clamp 401. The connection of the hot wire clamp 401 to a URD cable is well-known in the art. One means for connecting the hot wire clamp to the URD cable is using a 3M Quick Term II Termination Kit, sold by 3M Corporation. The neutral conductor 40 of each end of the URD MV cable is coupled to the neutral conductor of the MV cable. Alternately, as shown in FIG. 4, the neutral conductor 40 can be coupled to the neutral of the MV cable by a separate conductor that extends from near the center of the length of URD MV cable or from only one end.

Each hot wire clamp 401 is attached to the overhead MV cable. A data filter such as a RF choke 400 (or low pass filter) is disposed on the MV cable between the hot wire clamps 401. The data filter allows the power transmissions to pass unimpeded, but provides a high impedance to data signals. As a result, data signals are shunted around the filter 400 and through the URD MV cable and coupler 100. The coupler operates as described above to couple signals to and from the URD MV cable. The data signals are transmitted on the overhead MV cable in both directions away from the filter 400.

Figure 5:
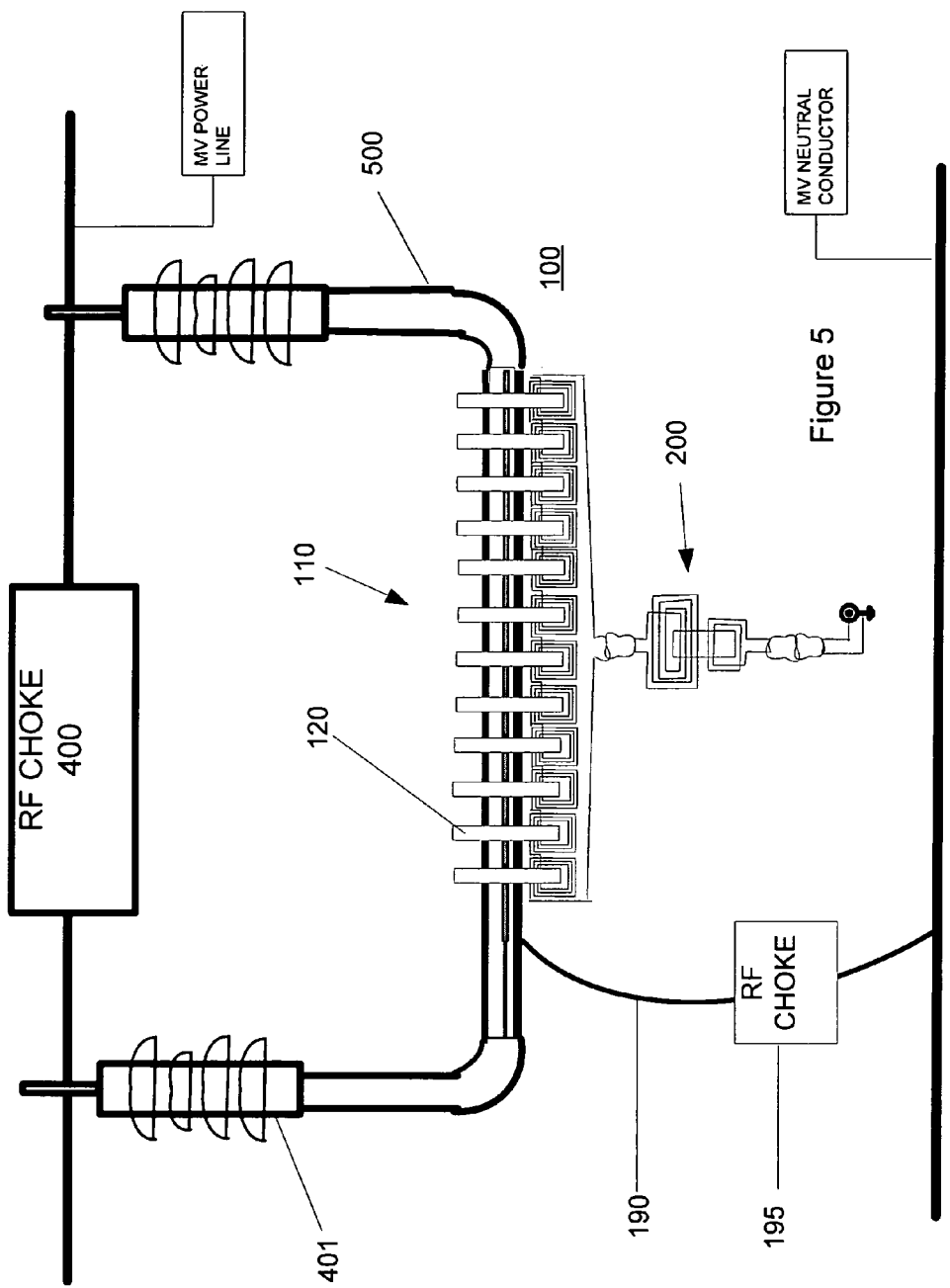
FIG. 5 is a schematical representation of yet another example embodiment of a coupling device according to the present invention.

Another embodiment of the present invention configured to couple data signals to and from the overhead power line is shown in FIG. 5. This embodiment includes a coupling transformer 100 with twelve coupling transformer toroids 120, which are series-wound with three turns per toroid. As discussed above, in practice the toroids 120 are positioned close to each other and are shown spaced apart in FIG. 5 for illustrative purposes.

This embodiment uses a length of six gauge, eight kV URD MV cable 500, which as with the other overhead embodiments, terminates with a 3M Quick Term II or equivalent termination kit. The two hot wire clamps 401 are clamped to the MV power line on either side of the RF choke 400. The clamps 401 may be attached to the ends of a housing that houses the RF choke (or low pass filter) 400. The housing may be formed of two portions, which are hinged together to allow for an open and closed configuration. The RF choke 400 may be formed of ferrite toroids, which are formed of two halves fixed in each portion of the housing and that mate together when the housing is in the closed configuration. Such a housing is disclosed in U.S. application Ser. No. 10/176,500, issued as U.S. Pat. No. 7,102,478 entitled "A Power Line Coupling Device and Method of Using the Same," which is hereby incorporated by reference. Such a housing, or a housing having many of these features, may also be used to hold the coupling transformer for use in the underground embodiment of the present invention as will be evident to those skilled in the art.

As shown in FIG. 5, this embodiment of the present invention need not make use of the neutral conductor 40 of the URD MV cable, which may be removed. The neutral semi-conductive jacket 30 is coupled to the neutral conductor of the MV power line by a conductor 190. The conductive path formed by conductor 190 includes a RF choke (or low pass filter) 195 to prevent the transmission of data signals to the MV neutral conductor. Thus, conductor 190 and the RF choke 195 (which may be a ferrite toroid or ferrite bead) form a low frequency conductive path to the neutral conductor of the MV cable to allow leakage currents to flow to ground.

Because this embodiment does not employ the neutral conductor, it also need not use an insulating spacer, or a toroid filter. As is known in the art, the overhead cables running parallel to each other will have a natural inductance along their lengths and capacitance between them, which is based on, among other things, the distance between the cables. These inductances and capacitances are substantially equivalent to a resistance between the conductors. This resistance is known as the "characteristic impedance" of the line. Without the neutral conductor 40, the primary winding of the coupling transformer 110 of this embodiment may be comprised of the center conductor of the URD MV cable and nearby power line cables such as one or both of the other two phase conductors as well the characteristic impedance between the cables. In addition, the neutral conductor may form all or part of the primary winding depending on what other overhead cables are present. Furthermore, other conductors, such as conductors of another three phase power line, may form part of the primary winding.

As will be evident to those skilled in the art, a first coupling device 100 may communicate with a second coupling device 100 that is on the same conductor as the first coupling device or placed on another conductor that forms part of the primary of the coupling transformer 110 of the first coupling device 100 (such as one of the other phase conductors, the neutral, or a conductor of a different three phase conductor set). Thus, the present invention facilitates communicating across conductors as well as through a single conductor.

While not shown in FIG. 5 (or the other figures), the coupling transformer 110 is preferably packaged in an environmentally protective, insulative encasing and/or disposed in a protective housing. In addition, the device may include a 0.150 inch layer of epoxy between the coupling transformer 110 and the URD cable (the semi-conductive jacket 30) and between the coupling transformer 110 and the external protective packaging. Similarly, the entire length of the URD MV cable may be packaged in an environmentally protective, insulative material.

Figure 6:
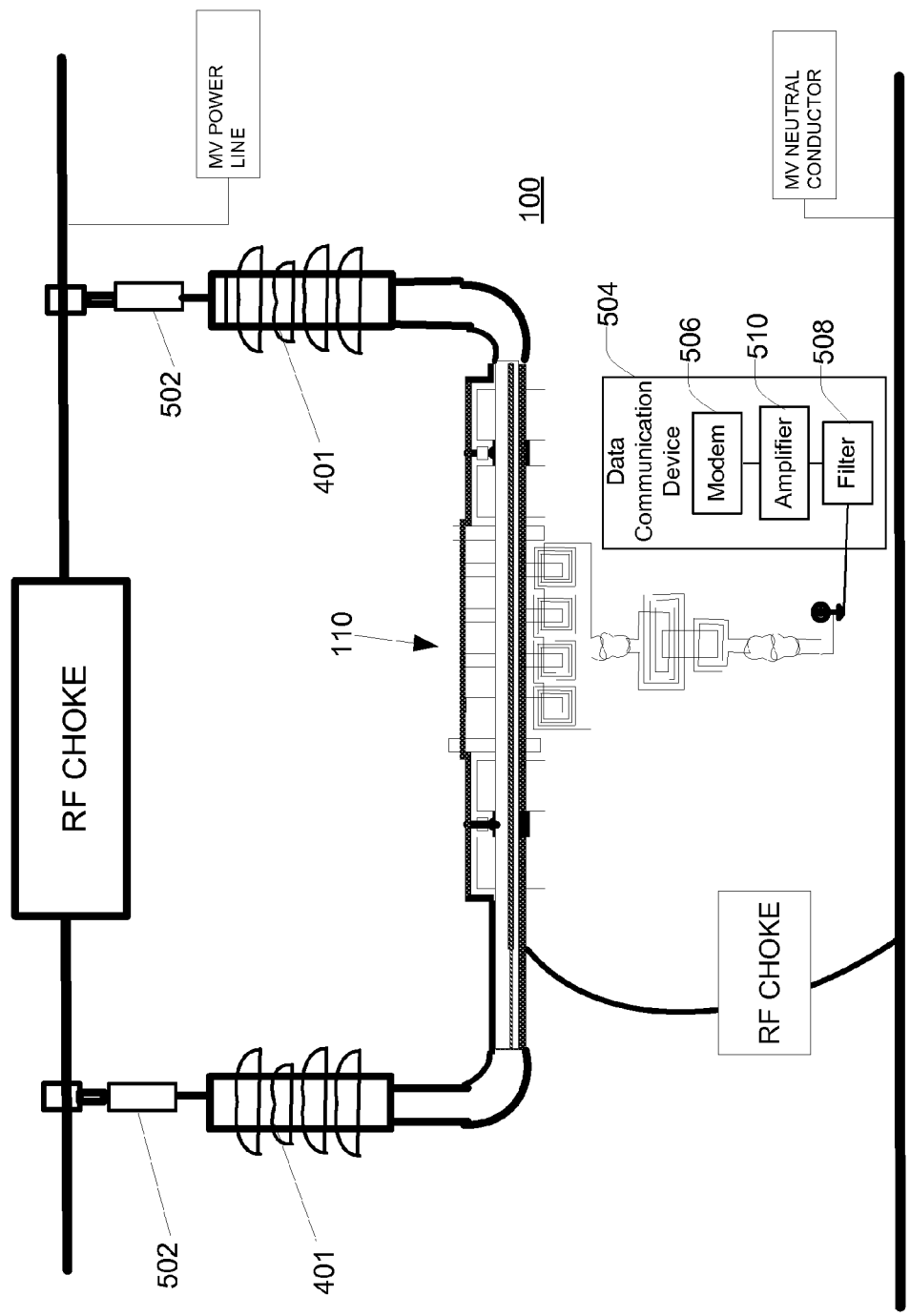
FIG. 6 is a schematic representation of still another example embodiment of a coupling device according to the present invention.

Also, optionally the ends of the URD MV cable may be attached to the MV power line through a fuse 502 (see FIG. 6). In particular, the hot wire clamps 401 may be attached to a fuse 502 on each end (instead of the power line) with the opposite ends of the fuses 502 attached to the power line. The fuses 502 prevent a catastrophic failure in the coupling device 100 from impacting the electrical distribution system.

As will be evident from the above description, the coupler 100 of the above embodiment is not voltage referenced to the MV conductor. Because the coupling device 100 is surrounded by cable components which are at ground potential, the electronics and power supplies associated with the coupler (e.g., in the associated data communication device 504 components (See FIG. 6)—modems 506, router, filters 508, amplifiers 510, processors and other signal processing circuitry) of the backhaul device, bypass device, or other device processing received and/or transmitted signals) do not have to be built to isolate the 8.66 kV potential from earth ground or from the low voltage power lines (which may be connected to the customer premises), which greatly reduces the complexity and cost of such a system. In other words, the coupler of the present invention provides electrical isolation from the medium voltage power lines (due to the insulation provided by the URD MV cable) while facilitating data communications therewith.

As will be evident to one skilled in the art, many of the components of the above embodiments may be omitted or modified in alternate embodiments. For example, the conductive path 170 between the neutral conductor 40 and the neutral semi-conductive jacket 30 may be omitted on one or both sides of the coupling transformer 100. Similarly, other methods for reducing (or preventing) the amount of energy that is coupled onto the neutral semi-conductive jacket 30 may be used in addition to or instead of the insulating spacers 150. For example, another embodiment of the present invention may include removing a portion of the neutral semi-conductive jacket around the entire circumference of the MV cable (on one or both sides of the coupling transformer) to increase the impedance of the neutral semi-conductive jacket 30 and thereby prevent coupling thereto. This alternate embodiment would likely be most suitable for the overhead application described above with reference to FIG. 3 as the length of the URD MV cable on each side of the gap in the neutral semi-conductive jacket 30 would be relatively short. In some embodiments of the present invention, increasing the impedance of the neutral semi-conductive jacket 30 may not be necessary and the insulating spacers 150 or other means for increasing the resistance of the neutral semi-conductive jacket 30 may therefore be omitted partially or completely. Again, such an alternate embodiment also likely would not require any conductive paths 170. Also, including an insulator (e.g., a layer of rubber) around the neutral conductor 40 and/or the neutral semi-conductive jacket 30 near the coupling transformer instead of using the insulating spacers 150 may allow for more flexibility in the coupler 100.

Also, instead of BNC connector 300, a URD MV cable connector may be used to connect the output of the transformer 200 to another URD MV cable that conducts the data signal to the data processing circuitry, which may include one or more of a filter, an amplifier, an isolator, a modem, and a data router.

In addition, some embodiments of the present invention may include only one or neither of the filters 160. Such an embodiment likely would be most suitable for environments or locations in which anticipated external radiation and interference are minimal (or where the neutral conductor 40 is not used). Also, other embodiments may employ different positioning of the filters, such as outside the insulating spacers 150 or may employ different means for attenuating the interference or high frequency non-data signals such as different type of filter.

The embodiments described above include four or twelve series-wound transformer toroids 120 adjacent to the neutral semi-conductive jacket 30. Other embodiments may include fewer (e.g., one, two or three) or more (e.g., five, six, fifteen, twenty or more) transformer toroids 120, which may or may not be series wound. In addition, as will be evident to those skilled in the art, each core member may be formed by a single toroid or a plurality of toroids disposed substantially adjacent to each other. In addition, the material from which the toroids are formed may be material other than ferrite. Similarly, the number of windings may be greater or fewer than the number disclosed for the above embodiment, but preferably less than ten windings and even more preferably less than six windings. Furthermore, the toroids may be series wound in pairs, in groups of three, groups of four, and/or some combination thereof. Some embodiments may not require series-wound core members or a plurality of core members.

Depending on the desired isolation and the impedance of the URD MV cable, the number of windings, the impedance of the connector 300, and other factors, the impedance matching transformer 200 may not be required or may be provided as an isolation transformer only for isolation purposes (as opposed to providing an impedance matching function).

Any toroids employed by the present invention may be slid down over the neutral semi-conductive jacket 30 or may be formed of two toroid halves that are pivoted together around the neutral semi-conductive jacket 30 (e.g., in a housing that pivots open and closed similar to that incorporated herein above). While the core members of the above embodiments are toroids, the core members of alternate embodiments may be formed of partial toroids such as a three quarter toroid, a half toroid, a toroid with a gap, or a non-toroid shape. Similarly, the filter 160 and insulating spacers 150 may be formed of partial toroids such as a three quarter toroid, a half toroid, a toroid with a gap, or a non-toroid shape.

Finally, the embodiments of the present invention described herein include a semi-conductive jacket. However, some embodiments may not employ a semi-conductive jacket and use only a conductor and surrounding insulator (e.g., an embodiment for overhead applications).

The foregoing has described the principles, embodiments, and modes of operation of the present invention. However, the invention should not be construed as being limited to the particular embodiments described above, as they should be regarded as being illustrative and not as restrictive. It should be appreciated that variations may be made in those embodiments by those skilled in the art without departing from the scope of the present invention.

While a preferred embodiment of the present invention has been described above, it should be understood that it has been presented by way of example only, and not limitation. Thus, the breadth and scope of the present invention should not be limited by the above described exemplary embodiments.

Obviously, numerous modifications and variations of the present invention are possible in light of the above teachings. It is therefore to be understood that within the scope of the appended claims, the invention may be practiced otherwise than as specifically described herein.

What is claimed is:

1. A device for coupling data signals to a power line conductor, the device comprising: a cable having a first end and a second end and comprising a cable conductor and an insulator disposed around said cable conductor; said cable conductor having a first end and a second end; at least one core disposed substantially around the entire circumference of a portion of said cable: a conductor winding around said core; and wherein said first end of said cable conductor is configured to be electrically coupled to the power line conductor at a first connection point on the power line conductor and wherein said second end said cable conductor is configured to be electrically coupled to the power line conductor at a second connection point on the power line conductor.

2. The device of claim 1, wherein said core is comprised of a plurality of ferrite core members.

3. The device of claim 1, further comprising a transformer comprising a first and a second winding, and wherein said first winding is in communication with said conductor winding.

4. The device of claim 3, wherein said transformer provides impedance matching.

5. The device of claim 1, wherein said cable conductor is configured to conduct a power signal having a voltage greater than one thousand volts.

6. The device of claim 1, wherein said device has a resonant frequency within about fifteen percent of a center frequency of a band of frequencies used for communicating the data signals.

7. The device of claim 1, further comprising a reactive circuit configured to modify the resonant frequency of the device.

8. The device of claim 1, wherein said conductor winding is in communication with a data communication circuit comprised of a filter, an amplifier, and a modem.

9. The device of claim 1, wherein said cable conductor is electrically coupled to the power line conductor at said cable conductor first end via a first fuse and at said cable conductor second end via a second fuse.

10. The device of claim 1, wherein the device is configured to couple data signals communicated via at least one carrier frequency between 30 and 50 megahertz.

11. A device for coupling data signals to a power line conductor carrying a voltage greater than one thousand volts, the device comprising:
a cable comprising a center conductor, and an insulator disposed around said center conductor, said center conductor of said cable having a first end and being configured to be electrically coupled to the power line conductor at a first connection point on the power line conductor and said center conductor having a second end being configured to be electrically coupled to the power line conductor at a second connection point on the power line conductor;
a core disposed adjacent said cable;
a conductor winding disposed adjacent said core;
wherein said center conductor of said cable, said core, and said conductor winding form a coupling transformer; and
wherein said first connection point and said second connection point are spaced apart on the power line conductor.

12. The device of claim 11, wherein said cable further comprises a semi-conductive jacket disposed around said insulator of said cable and wherein said core is disposed outside said semi-conductive jacket of said cable.

13. The device of claim 12, further comprising a conductive path coupling said semi-conductive jacket to a neutral conductor.

14. The device of claim 13, wherein said conductive path is a low frequency conductive path.

15. The device of claim 11, wherein said conductor winding is in communication with a data communication circuit comprised of a filter, an amplifier, and a modem.

16. The device of claim 11, wherein said first end of said center conductor is configured to be electrically coupled to the power line conductor via a first fuse and said second end of said center conductor is configured to be electrically coupled to the power line conductor via a second fuse.

17. A device for coupling data signals with a power line conductor, the device comprising: a cable having a first end and a second end and comprising a center conductor and an insulator disposed around, said center conductor; at least one core disposed substantially around the entire circumference of a portion of said cable; a conductor winding around said core; and a first fuse electrically coupled to a first end of said center conductor; a second fuse electrically coupled to a second end of the center conductor; wherein said first fuse is configured to be electrically coupled to the power line conductor at a first connection point on the power line conductor; and wherein said second fuse is configured to be electrically coupled to the power line conductor at a second connection point on the power line conductor.

18. The device of claim 17, wherein said conductor winding is in communication with a data communication circuit comprised of a filter, an amplifier, and a modem.

19. The device of claim 17, wherein the power line conductor is an overhead un-insulated power line carrying a voltage greater than one thousand volts.

20. The device of claim 17, further comprising a transformer comprising a first and a second transformer winding, and wherein said first transformer winding is in communication with said conductor winding.

* * * * *

UNITED STATES PATENT AND TRADEMARK OFFICE
CERTIFICATE OF CORRECTION

| | | |
|---|---|---|
| PATENT NO. | : 7,224,243 B2 | |
| APPLICATION NO. | : 11/217316 | |
| DATED | : May 29, 2007 | |
| INVENTOR(S) | : Cope | |

It is certified that error appears in the above-identified patent and that said Letters Patent is hereby corrected as shown below:

Title Page, in field (56), under "U.S. Patent Documents", in column 2, line 13, delete "6/2003" and insert -- 07/2003 --, therefor.

Title Page, in field (56), under "U.S. Patent Documents", in column 1, line 7, delete "Zalitsky" and insert -- Zalitzky --, therefor.

Title Page, in field (56), under "Other Publications", in column 2, line 18, delete "Transceiever" and insert -- Transceiver --, therefor.

In column 4, line 41, after "turn" insert -- is --.

In column 9, line 12, delete "Mv" and insert -- MV --, therefor.

In column 11, line 57, after "signals" delete ")".

In column 13, line 48, in Claim 1, after "end" insert -- of --.

Signed and Sealed this

Twenty-fourth Day of July, 2007

JON W. DUDAS
*Director of the United States Patent and Trademark Office*